Figure 1:
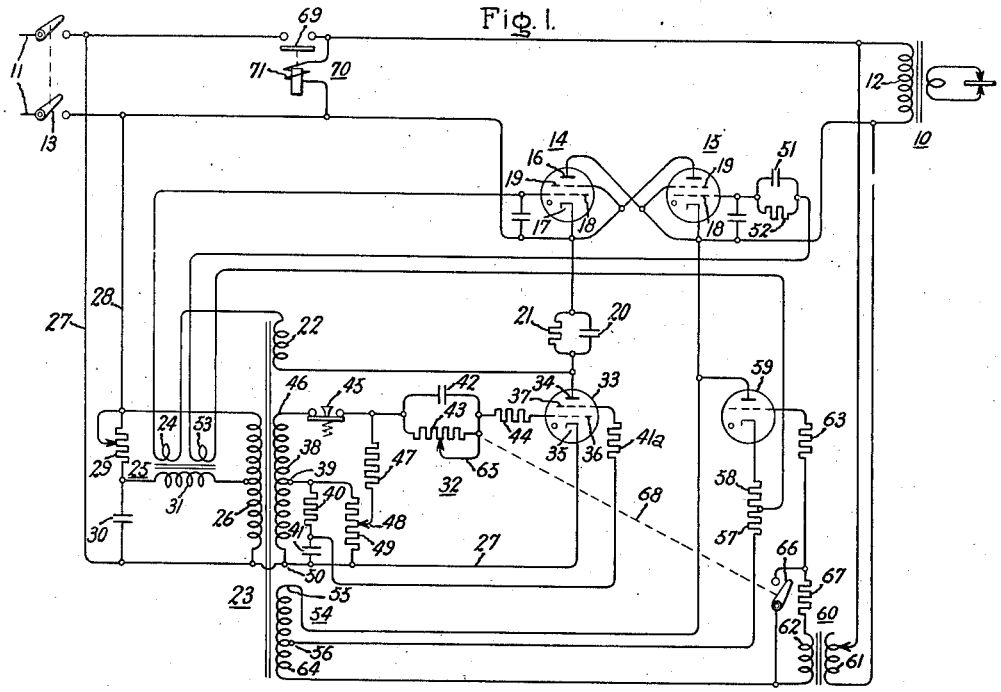

Sept. 26, 1944.        M. E. BIVENS        2,359,080
ELECTRIC CONTROL CIRCUIT
Filed Sept. 30, 1942

Inventor:
Maurice E. Bivens,
by Harry E. Dunham
His Attorney.

Patented Sept. 26, 1944

2,359,080

UNITED STATES PATENT OFFICE 2,359,080

ELECTRIC CONTROL CIRCUIT

Maurice E. Bivens, Schenectady, N. Y., assignor to General Electric Company, a corporation of New York Application September 30, 1942, Serial No. 460,241

18 Claims. (Cl. 250—27)

My invention relates to electric control circuits and particularly to an improved electric timing circuit. While not limited thereto, my invention is particularly well adapted for controlling the period of energization of a load circuit by means of electric valves.

The use of controlled electric valves for supplying accurately timed current impulses to a load circuit, particularly in the resistance welding field, has become common practice. Many of these circuits have functioned well but require an inordinate amount of equipment for the type of control accomplished. In accordance with the teachings of my invention, I provide an improved electric control circuit including a precision timing device which requires a minimum of equipment and, as a result, may be manufactured at low cost.

It is an object of my invention to provide a new and improved electric control circuit.

It is another object of my invention to provide a new and improved electronic timing of circuit.

It is another object of my invention to provide a new and improved electric valve control circuit for supplying accurately timed impulses of current to a load circuit.

It is a still further object of my invention to provide an improved electronic timing circuit which does not require an auxiliary source of direct-current voltage.

In accordance with the illustrated embodiment of my invention, a pair of reversely connected electric valves are connected between an alternating-current supply circuit and a welding transformer to control the transfer of current thereto. The electric valves are controlled in leading and trailing relationship, that is, the trailing tube is arranged to conduct only during half cycles immediately following a period of conduction of the leading tube. The leading tube is controlled by an improved timing circuit including an electric valve having two principal electrodes and two control members. A capacitor in the excitation circuit of the leading tube is connected in circuit with the principal electrodes of the timing valve and energized from the alternating-current supply circuit. One of the control members is energized from the alternating-current supply circuit fith a component of voltage tending to render the timing valve conductive. The other of the control members is energized by an alternating-current component of voltage which maintains the timing valve nonconductive until a predetermined time in supply circuit voltage wave at which time it conducts current to charge the capacitor in the excitation circuit of the leading valve to provide a negative bias. A capacitor in circuit with the first-mentioned control member of the timing valve is charged during each period of conduction of the timing valve to establish a negative bias on the control member thereof. As long as the timing valve conducts each cycle, the negative bias on the leading tube is sufficient to maintain it nonconductive and the load circuit is maintained deenergized. An initiating switch in circuit with the first control member of the timing valve reduces the magnitude of the alternating-current component of voltage to such an extent that the timing valve is not rendered conductive each cycle of the supply voltage. This removes the source of charge for the condenser in the excitation circuit of the leading valve and allows it to discharge sufficiently so that the peaked voltage, which is also connected in the excitation circuit of the leading valve, renders it conductive at a predetermined time in the voltage cycle of the supply circuit. Adjustment of the discharge circuit of the capacitor in circuit with the first control member of the timing valve determines the number of cycles of supply circuit voltage which elapse before the timing valve is again rendered conductive and the negative voltage on the capacitor of the leading tube periodically restored to maintain the leading tube nonconductive.

My invention will be better understood by reference to the following description taken in connection with the accompanying drawing and its scope will be pointed out in the appended claims. In the drawing, Fig. 1 is a schematic representation of one embodiment of my invention and Fig. 2 represents various voltage relations existing in the circuit of Fig. 1 during operation thereof.

Referring now to the drawing, I have shown my invention embodied in an electric control circuit for controlling the energization of a resistance welding transformer 10 from an alternating-current supply circuit 11. The primary winding 12 of the welding transformer is connected with the supply circuit 11 through the contacts of a line switch, illustrated schematically at 13, and a pair of electric valve means 14 and 15 which are reversely connected in parallel to supply alternating current to the welding transformer 10. The electric valves 14 and 15 may be of any of the types well known in the art and, as illustrated, each comprises an anode 16, a cathode 17, a control member or grid 18, and a shield grid 19. The elements of each of the valves are enclosed in an envelope, preferably containing an ionizable medium such as a gas or vapor. The electric valve 14 may be designated the leading valve inasmuch as the periods of energization of the load circuit are controlled by controlling the excitation of the control member 18 thereof while the electric valve 15 is rendered conductive only for half cycles immediately following a half cycle of conduction of the leading valve. The excitation circuit for the control member 18 of valve 14 includes in series a capacitor 20 having a discharge resistor 21 connected in parallel therewith, the secondary winding 22 of a transformer 23, and the secondary winding 24 of a transformer 25. The transformer winding 22 impresses on the control member 18 an alternating-current component of voltage which is substantially 180 degrees out of phase with the anode-cathode voltage of the electric valve 14. The winding 24 impresses a voltage of peaked-wave form on the control member 18 which has an adjustable phase relation with respect to the supply circuit voltage. As illustrated in the drawing, the transformer 23 has a midtapped primary winding 26 energized from the supply circuit 11 through conductors 27 and 28. The midtap of the winding 26 and the common terminal of an adjustable resistor 29 and capacitor 30 which are connected in series across the end terminals of winding 26 provide a source of adjustable phase alternating-current voltage to which the primary winding 31 of the transformer 25 is connected.

Figure 2:
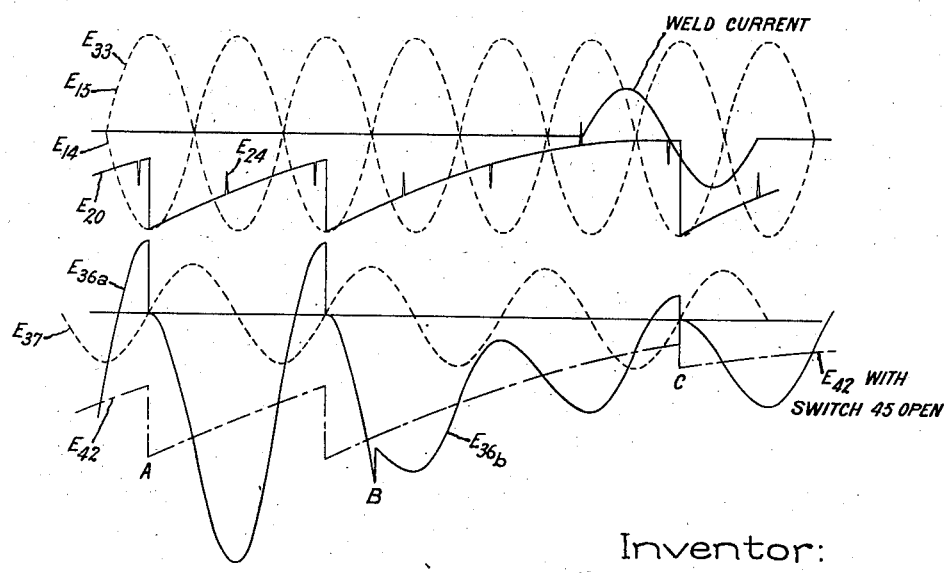

The transformer 23 also provides a source of alternating-current voltage for the improved timing circuit illustrated in Fig. 1 and designated generally by the numeral 32. The timer circuit includes an electric valve 33 having an anode 34, a cathode 35, a control member 36, and a second control member 37. Electric valve 33, which is preferably of the type utilizing an ionizable medium has the anode thereof connected through capacitor 20 and resistor 21 to the cathode of the leading electric valve 14 which is also one side of the alternating-current supply circuit. The cathode of the electric valve 33 is connected to the other terminal of the alternating-current supply circuit 11 through the conductor 27. From an inspection of Fig. 1, it will be noted that the anode-cathode voltage of timing valve 33 is in phase with the anode-cathode voltage of trailing tube 15. A source of alternating control voltage for energizing the control members 36 and 37 is provided by a secondary winding 38 on the transformer 23. The winding 38 is provided with an intermediate terminal 39 which is connected to the cathode of the electric valve 33 and also to one of the end terminals of the winding 38 through a series-connected resistor 40 and capacitor 41. The common terminal of the resistor 40 and the capacitor 41 is connected with control member 37 through a suitable current-limiting resistor 41a to impress thereon an alternating-current component of voltage having a definite phase relation with respect to the anode-cathode voltage and which preferably lags the anode-cathode voltage of the electric valve 33 by substantially 90 electrical degrees.

The control member 36 of the electric valve 33 is energized by two components of voltage, one of which is the unidirectional voltage produced across a capacitor 42 by grid rectification. A suitable adjustable resistance element 43 connected in parallel with the capacitor 42 provides means for determining the time constant of the discharge circuit of the capacitor 42. One terminal of the parallel connected capacitor 42 and resistor 43 is connected with control member 36 through a current-limiting resistor 44 while the other terminal is connected to points of different potential on the transformer winding 38 through parallel circuits. One of the parallel circuits is completed through a normally closed weld-initiating switch 45 to an end terminal 46 of the transformer winding 38 while the other circuit is completed through a resistor 47, an adjustable tap 48 on a voltage-dividing resistor 49 which is connected between the intermediate terminal 39, and the other end terminal 50 of the transformer winding 38. Thus the control member 36 is energized by a unidirectional component of voltage appearing across the capacitor 42 and an alternating-current component of voltage appearing between the end terminals 46 and 50 of the transformer winding 38 when the switch 45 is closed. When the switch 45 is open, the alternating-current component of voltage is reduced to that appearing between the tap 48 and the terminal 50. Before describing the operation of the timing circuit 32 and the manner in which it controls the leading valve 14, the control for effecting conduction of the valve 15 in response to each conduction of valve 14 will be described. The cathode-to-control-member circuit of the electric valve 15 includes in series a self-biasing circuit including a condenser 51 and resistor 52, a secondary winding 53 of the transformer 25 and a portion of the voltage of a secondary winding 54 of the transformer 23. The end terminal 55 of winding 54 is connected directly with the cathode of electric valve 15 and an intermediate terminal 56 of the transformer winding 54 is connected to the cathode of electric valve 15 through current-dividing resistors 57, 58, and the anode-cathode circuit of an electric valve 59 which is preferably of the gas-filled type. From this circuit, it is seen that, when electric valve 59 is nonconducting, the voltage between terminals 55 and 56 of the winding 54 is impressed on the control member 18 of electric valve 15. When the electric valve 59 is conducting, the voltage on the control member is reduced to a fraction of this voltage depending upon the relative magnitude of resistors 57 and 58. The instantaneous polarity and magnitude of the voltage impressed on control member 18 by the transformer winding 54 is such as to maintain the electric valve 15 nonconducting when the valve 59 is nonconducting. The conductivity of electric valve 59 and, as a result, the conductivity of valve 15 is controlled in accordance with the energization of the load circuit 12 by current conducted by valve 14 by means of a transformer 60 having the primary winding 61 thereof energized from the primary winding 12 of the transformer 10. The secondary winding 62 of the transformer 60 has one terminal thereof connected with the control member of electric valve 59 through current-limiting resistor 63 and the other terminal thereof connected to the cathode of electric valve 59 through a portion 64 of the transformer winding 54 and the resistors 57 and 58. The voltage of the winding portion 64 tends to maintain electric valve 59 nonconducting and this voltage is overcome by the voltage of winding 62 each time the leading valve 14 conducts current to energize the transformer primary winding 12. This renders electric valve 59 conducting in response to a period of conduction of the leading valve 14. The constants of the excitation circuit of the control member 18 of the trailing electric valve 15 are such that the reduction in the alternating-current hold-off voltage resulting from conduction of valve 59 is not, in itself, sufficient to render trailing electric valve 15 conductive. This is accomplished at a definite time in the anode-cathode voltage thereof by means of the peaked voltage produced by the secondary winding 53 of the transformer 25 which may be adjusted in phase by varying the magnitude of resistor 29 of the phase-shifting circuit. The circuit described above for controlling the conduction of electric valve 15 in trailing relationship with respect to valve 14 and for the same portion of the anode-cathode voltage wave is similar to the circuit disclosed and claimed in my Patent 2,283,719, issued May 19, 1942, and assigned to the same assignee as the present invention.

Inasmuch as it is contemplated in the operation of the system described above that the resistor 43 in the control member circuit of valve 33 be adjusted to provide half-cycle operation of the welder, I provide means for disabling the control circuit of the trailing tube when the movable element 65 of resistor 43 is adjusted to that position. This means includes a switch 66 which shunts the secondary winding 62 of transformer 60 and a current-limiting resistor 67 connected in series therewith. To effect the automatic closure of switch 66 when the movable element 65 of the resistor 43 is moved to a position corresponding to half-cycle operation of the welding circuit, a suitable mechanical interlock, shown schematically at 68, is provided between element 65 and switch 66.

In the illustrated embodiment, the circuits employed for heating the cathodes of the electric valves 4, 15, 33, and 59 have been omitted in order to simplify the drawing. As is well understood, it is desirable to provide for the heating of the cathodes to normal operating temperature before the application of anode-cathode voltage to the valves in cases where the valves are called upon to deliver a considerable current. As illustrated in Fig. 1, the anode-cathode circuits of control valves 33 and 59 are energized immediately upon closure of switch 13. This insures that the timing circuit 32 will function to charge the capacitor 20 to impress a negative voltage on the control member 18 of the leading electric valve 14 before anode-cathode voltage is impressed on the valve 14. Because of the limited current transmitted by these valves, such operation is not detrimental. In the particular arrangement illustrated in the drawing, the application of voltage to the valves 14 and 15 is accomplished manually after the switch 13 has been closed and the cathodes heated by closing the contact 69 of an under-voltage relay 70 having the coil 71 thereof energized on the load side of contact 69. In this way, the contact 69 is maintained closed after manual closing thereof. It will be apparent that any suitable control for insuring that the cathodes of the electric valves are brought to proper operating temperature and that the timer circuit is energized before the main electric valves may be employed.

The features and advantages of my invention may be better understood by brief consideration of the operation of the illustrated embodiment thereof together with particular references to the voltage relationships illustrated in Fig. 2. When switch 13 is closed, transformer 23 is energized and the control member 36 of electric valve 33 is energized with an alternating-current component of voltage $E_{36a}$ corresponding to the voltage across the terminals 46, 50 of the transformer winding 38. This voltage is of a polarity to render the electric valve 33 conducting. However, the 90 degree lagging component of voltage $E_{37}$ impressed on the control member 37 maintains the electric valve 33 nonconducting until the 90 degree point of the anode-cathode voltage $E_{33}$. Electric valve 33 then conducts and charges the capacitor 42 to a negative voltage equal to the crest value of the alternating-current voltage $E_{36a}$ by grid rectification as shown at point A on the curve $E_{42}$, representing the voltage on capacitor 42. At the same time, the capacitor 20 is charged to the crest value of the anode-cathode voltage of valve 33, represented by curve $E_{33}$, as illustrated by the curve $E_{20}$. Curve $E_{33}$ also represents the anode-cathode voltage of valve 15 and is, therefore, also designated $E_{15}$. $E_{14}$ represents the anode-cathode voltage of valve 14. The time constants of the charging circuits of capacitors 20 and 42 are very low so that the complete charging of these capacitors requires only a fraction of a millisecond. The discharge circuit for capacitor 20 has a time constant in the order of one complete cycle of the supply circuit and the time constant of the discharge circuit of the capacitor 42 may be adjusted over a wide range and is set so that the time that valve 33 is nonconducting is equal to one cycle of the supply voltage plus the desired length of the current impulse to be supplied to the load circuit. If the switch 45 is not open, the timing period is initiated once each cycle of the supply voltage when the electric valve 33 conducts and the negative bias on the capacitor 20 in the excitation circuit of the leading tube 14 is, therefore, replenished once each cycle. If, however, the switch 45 is open at any instant, such as the point B, the alternating-current component of voltage on the control member 36 is suddenly reduced to the value represented by the curve $E_{36b}$ which corresponds to the voltage appearing between terminals 49 and 50 of transformer winding 38. This voltage may conveniently be approximately one-third the magnitude of the voltage $E_{36a}$ and the time required for the charge on capacitor 42 to decrease to such an extent that the combined voltage $E_{42}$ and $E_{36b}$ become positive will determine the length of the current impulse supplied to the load circuit. It should be noted that the voltage of the control grid 37 maintains the operation of timing valve 33 in synchronism with supply circuit voltage and delays the initiation of conduction of the valve 33 even though the control member 36 becomes positive before that time. When the valve 33 conducts at point C, the condenser is charged negatively, but only to a value corresponding to the crest value of the voltage $E_{36b}$. When switch 45 is closed, the original conditions of operation described above are restored. In the particular representation of Fig. 2, the resistor 43 is adjusted for one cycle operation and, for this reason, the decay of charge on condensers 42 and 20 are substantially the same. It will be readily understood that, as the resistor 43 is adjusted for longer periods of energization, the charge on capacitor 42 will decay at a much slower rate. As illustrated on the curve $E_{20}$, representing the voltage of the capacitor 20, the superimposed voltage peaks $E_{24}$ control the instant in the anode-cathode voltage of the leading valve at which conduction is initiated and this may be adjusted independently of the timing cycle. If heat control is obtained by some means other than phase control, the voltage peaks $E_{24}$ will be adjusted to occur at the power-factor angle of the load circuit. In order to simplify Fig. 2, the alternating-current hold-off voltage produced by transformer winding 22 and impressed on control member 18 of valve 14 has been omitted. The magnitude of this voltage is correlated with the other voltages of the excitation circuit so that the operation described above is accomplished. This voltage insures that the leading electric valve will not conduct at any time other than that determined by the peaked voltage even when the condenser voltage is reduced to zero. The operation of the trailing tube control is believed apparent from the previous detailed description of the trailing tube circuit.

In order to effect half-cycle operation by disabling the trailing tube, an additional position of the movable element 65 of resistor 43 is provided corresponding to half-cycle operation. In this position of the element 65, the time constant of capacitor 42 is the same as when the element 65 is set for full-cycle operation. However, movement of the element 65 to the second position closes the switch 66 and disables the trailing tube.

It will be appreciated that a circuit embodying the present invention provides a precision electronic timer which initiates a timing period once for each cycle of the alternating-current supply voltage and that the timer resets each cycle as long as the weld-initiating switch is not operated. When the weld-initiating switch is operated, the timing period continues and has a duration depending upon the setting of the variable resistor in the circuit of the control member of the timing valve 33.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, an alternating-current supply circuit, a load circuit, electric translating apparatus connecting said circuits including electric valve means having a control member, a capacitor connected in circuit with said control member and a discharge circuit for said capacitor continuously tending to discharge said capacitor, means for charging said capacitor in synchronism with said alternating-current supply circuit to maintain a charge on said capacitor of a polarity and sufficient magnitude to maintain said valve means non-conducting, and timing means for preventing charge of said capacitor for a predetermined number of cycles to effect the energization of said load circuit for a predetermined period.

2. In combination, an alternating-current supply circuit, a load circuit, electric valve means interconnecting said circuits for transmitting current therebetween, a control member for controlling the conductivity of said electric valve means, a capacitor connected in circuit with said control member and a discharge circuit for said capacitor, means for periodically charging said capacitor substantially instantaneously and in synchronism with said alternating-supply circuit to maintain a charge on said capacitor of a polarity and sufficient magnitude to maintain said valve means non-conducting, and timing means operable to prevent charging of said capacitor for a predetermined number of cycles to effect the energization of said load circuit for a predetermined period.

3. In combination, an alternating-current supply circuit, a load circuit, electric translating apparatus interconnecting said circuits including electric valve means having a control member, means for rendering said electric valve means conductive for an accurately timed interval comprising a capacitor connected in circuit with said control member, means for producing across said capacitor a cyclically varying unidirectional voltage having a magnitude and polarity to maintain said valve means nonconductive, and means for initiating a period of energization of said load circuit comprising means for preventing charging of said capacitor for a predetermined interval.

4. A supply circuit, a load circuit, electric translating apparatus interconnecting said circuits including electric valve means having a control electrode, means for impressing on said control electrode a periodic voltage tending to render said electric valve means conductive once during each cycle of voltage of said supply circuit, a capacitor connected with said control member and a discharge circuit for said capacitor, means for charging said capacitor in synchronism with said alternating-current supply voltage once during each cycle of supply circuit voltage to maintain said electric valve means nonconducting, and means operable at random with respect to said supply circuit voltage for preventing recharging of said capacitor for a predetermined interval of time to initiate conduction of said electric valve means at each occurrence of said periodic voltage until the expiration of said interval of time.

5. In combination, a supply circuit, a load circuit, electric translating apparatus connected between said circuits and including electric valve means for controlling the transfer of current between said supply and said load circuits, an excitation circuit for said electric valve means including a capacitor and a discharge circuit therefor, a timing circuit for controlling the charging of said capacitor comprising an electric valve including a pair of principal electrodes and control means, means connecting said capacitor and the principal electrodes of said electric valve in series and to said source for energization therefrom, means for energizing said control means of said valve to render said valve periodically conductive to maintain a hold-off voltage on said capacitor, and means for maintaining said electric valve nonconductive for a predetermined period of time to permit said capacitor to discharge and render said valve means conducting to provide a timed period of energization of said load circuit.

6. In combination, an alternating-current supply circuit, a load circuit, electric translating apparatus connected between said circuits and including electric valve means having a control electrode, means for impressing a periodic voltage on said control electrode tending to render said electic valve means conductive, means including a capacitor for rendering said periodic voltage ineffective and a timing circuit including an electric valve normally rendered conductive once during each cycle of said alternating-supply circuit for cyclically restoring the voltage on said capacitor, and means for maintaining said electric valve nonconducting for a predetermined interval of time to initiate a timed period of energization of said load circuit.

7. In combination, an alternating-current supply circuit, a load circuit, electric translating apparatus interconnecting said circuits and including electric valve means having a control electrode, energy-storage means associated with said control electrode for impressing thereon a hold-off voltage and a timing circuit for controlling the charge on said energy-storage means to control the periods of conduction of said electric valve means comprising an auxiliary electric valve having the anode-cathode circuit thereof energized from said alternating-supply circuit, and a control circuit for said auxiliary electric valve for rendering said electric valve conductive at substantially the point of maximum voltage of said alternating-current supply circuit to reestablish the charge on said energy-storage means once each cycle of said supply circuit, and means for rendering said auxiliary electric valve nonconductive for a predetermined interval of time to render said energy-storage means ineffective to maintain said electric valve means nonconductive and thereby initiate a timed period of energization of said load circuit.

8. In combination, an alternating-current supply circuit, a load circuit, electric translating apparatus interconnecting said circuits including electric valve means having a control member, means for impressing a plurality of voltage components on said control member including a periodic voltage component tending to render said electric valve means conductive and a capacitor having a discharge circuit tending continuously to discharge said capacitor, means for charging said capacitor at a predetermined periodicity and with a polarity tending to render said electric valve means nonconductive, the voltage components impressed on said control member being so related that said valve means remains nonconductive as long as said capacitor is charged at said predetermined periodicity, and means for preventing charging of said capacitor for a predetermined interval to effect the energization of said load circuit for a timed interval.

9. In combination, an alternating-current supply circuit, a load circuit, electric translating apparatus interconnecting said circuit including a pair of reversely connected electric valve means for supplying alternating-current to said load circuit, excitation circuits for said electric valve means for rendering said electric valve means conductive in leading and trailing relationship, a timing circuit for the leading electric valve means comprising an auxiliary electric valve and a capacitor, means connecting said auxiliary electric valve and said capacitor in series and for energization from said supply circuit in such a manner that the instantaneous polarity of the anode of said auxiliary electric valve is the same as the instantaneous polarity of the anode of said trailing electric valve means, means for rendering said auxiliary electric valve conductive at the periodicity of said alternating-current supply circuit to restore the charge on said capacitor in synchronism with said supply circuit voltage, and means for rendering said auxiliary electric valve nonconductive for a predetermined interval of time to render said electric valve means conducting for a timed interval.

10. In combination, an alternating-current supply circuit, a load circuit, electric translating apparatus interconnecting said circuits including a pair of reversely connected electric valve means for supplying alternating current to said load circuit, excitation circuits for said electric valve means for rendering said electric valve means conductive in leading and trailing relationship, a timing circuit for the leading valve means comprising an auxiliary electric valve having the anode-cathode circuit thereof energized from said alternating-current supply circuit in such a manner that the instantaneous polarity of the anode of said auxiliary electric valve is the same as the instantaneous polarity of the anode of said trailing electric valve means, means for rendering said auxiliary electric valve conductive at a predetermined periodicity, and means connected in the excitation circuit of said leading electric valve means and responsive to conduction of said auxiliary electric valve for miantaining said electrice valve means nonconductive as long as said auxiliary electric valve conducts at said predetermined periodicity.

11. In combination, a supply circuit, an electric valve including an anode, a cathode, and a control member, a capacitor and a discharge circuit therefor, means connecting said capacitor and said supply circuit with the anode-cathode circuit of said valve so that said capacitor is charged from said supply circuit when said valve conducts, a control circuit for energizing said control member comprising a capacitor and a discharge circuit therefor and means for impressing a periodic voltage on said control member, said source of periodic voltage having a magnitude and polarity to render said valve conductive once during each period of said voltage to restore the charge on both of said capacitors periodically, and means for modifying said periodic voltage to maintain said valve nonconductive for an interval of time dependent upon the time constant of the discharge circuit of the capacitor in said control circuit to prevent restoration of the charge on the capacitor connected with the anode-cathode circuit of said valve until the expiration of said interval.

12. In combination, an alternating-current supply circuit, an electric valve having an anode, a cathode, and a pair of control members, a capacitor connected in series with the anode-cathode circuit of said electric valve and for energization from said alternating-current supply circuit, a capacitor connected in circuit with one of said control members, a discharge circuit for said last-named capacitor, means for impressing on said one of said control members an alternating-current component of voltage substantially in phase with the supply circuit voltage impressed on the anode-cathode circuit of said electric valve, means for impressing on the other of said control members a voltage which maintains said electric valve nonconducting until a predetermined point in the anode-cathode voltage wave to render said electric valve conducting synchronously with respect to said supply circuit voltage and for replenishing the charge on both of said capacitors, and means for reducing the magnitude of the alternating-current voltage impressed on said first control member to maintain said electric valve nonconducting for an interval of time dependent upon the magnitude of reduction of said alternating-current voltage and the time constant of the discharge circuit of said second capacitor.

13. An electronic timer comprising in combination an alternating-current supply circuit, an electric valve having a pair of principal electrodes and a pair of control electrodes, a capacitor, means connecting said capacitor and the principal electrodes of said electric valve for energization from said supply circuit, means for impressing a turn-on voltage on one of said control members, means for impressing a periodic voltage on the other of said control members for maintaining said valve nonconductive until a predetermined point in the voltage wave of said supply circuit regardless of the voltage of said first control member, a capacitor connected to said first control member and adapted to be charged by rectifying action of said control member and one of said principal electrodes, a discharge circuit for said capacitor tending continuously to discharge said capacitor, and switching means for reducing the magnitude of the turn-on voltage impressed on said first control member to render said electric valve nonconductive for an interval dependent upon the magnitude of the reduction of said turn-on voltage and the time constant of the discharge circuit of said capacitor.

14. An electric timer comprising in combination, an alternating-current supply circuit, an electric valve having a pair of principal electrodes and a pair of control electrodes, means connecting the principal electrodes of said electric valve for energization from said supply circuit, means for impressing an alternating turn-on voltage on one of said control electrodes, means for impressing on the other of said control electrodes an alternating voltage lagging with respect to the voltage impressed on said principal electrodes by substantially ninety electrical degrees to maintain said valve nonconducting until the region of maximum voltage across said principal electrodes, a capacitor connected to said one of said control electrodes and adapted to be charged to the amplitude of said turn-on voltage by rectifying action of said one of said control electrodes and one of said principal electrodes, means for reducing the amplitude of said turn-on voltage, and means for adjusting the discharge rate of said capacitor to determine the interval required for the reduction of voltage of said capacitor to equal the reduction in magnitude of said turn-on voltage.

15. In combination, an alternating-current supply circuit, an electric valve having an anode, a cathode, and a control member, means connecting the anode-cathode circuit of said electric valve for energization from said alternating-current circuit, means for impressing an alternating-current component of voltage on said control member, a capacitor connected with said control member, a discharge circuit for said capacitor continuously tending to discharge said capacitor, said alternating-current component of voltage being sufficient in magnitude to render said electric valve conductive each cycle of said alternating-current voltage, means for maintaining said electric valve nonconducting until a predetermined point in the voltage wave of said supply circuit to synchronize the charging of said capacitor with the voltage of said supply circuit, and means for reducing the magnitude of said alternating-current voltage component to maintain said electric valve nonconductive for a predetermined number of cycles to effect a timing operation.

16. In combination, an alternating-current supply circuit, an electric valve having an anode, a cathode, and a pair of control members, means connecting the anode-cathode circuit of said electric valve for energization from said alternating-current circuit, means for impressing an alternating-current component of voltage on one of said control members, a capacitor connected of said one of said control members, a discharge circuit for said capacitor continuously tending to discharge said capacitor, said alternating-current component of voltage being sufficient in magnitude to render said electric valve conductive each cycle of said alternating-current voltage, means for impressing an alternating-current voltage on the other of said control members to maintain said electric valve nonconductive until a predetermined point in the voltage wave of said supply circuit to synchronize the charging of said capacitor with the voltage of said supply circuit, means for reducing the magnitude of said alternating-current voltage component to maintain said electric valve nonconductive for a predetermined number of cycles and means responsive to the periods of conducting and nonconducting of said electric valve for effecting the timing operation.

17. In combination, an alternating-current supply circuit, a load circuit, electric translating apparatus interconnecting said circuits including a pair of reversely connected electric valve means for supplying alternating current to said load circuit, excitation circuits for said electric valve means for rendering said electric valve means conductive in leading and trailing relationship, a timing circuit for the leading electric valve means including a movable element for adjusting the length of the time interval of energization of said load circuit, means for disabling the excitation circuit of said trailing electric valve means, and means interlocking said adjustable impedance element and said last-mentioned means to disable the excitation circuit of said trailing valve means when said movable element is adjusted to effect energization of said load circuit for a half cycle.

18. In combination, an alternating-current supply circuit, a load circuit, electric translating apparatus interconnecting said circuits including electric valve means having a control member, a pair of capacitors, means connecting one of said capacitors in circuit with said control member to provide a hold-off voltage, means for rapidly charging both of said capacitors at a predetermined periodicity and at a predetermined point in the voltage wave of said supply circuit, the hold-off voltage supplied by said one capacitor being sufficient to maintain said valve means nonconductive as long as the charge thereon is replenished at said periodicity, and means for initiating a period of energization of said load circuit comprising means for preventing recharge of both of said capacitors, the continued discharge of said one of said capacitors being effective to render said electric valve means conductive, the continued discharge of the other of said capacitors to a predetermined level providing means for reinitiating the periodic charging of both of said capacitors to terminate said period of energization.

MAURICE E. BIVENS.